US010043490B2

(12) United States Patent
Morein

(10) Patent No.: US 10,043,490 B2
(45) Date of Patent: Aug. 7, 2018

(54) REQUESTING DISPLAY FRAMES FROM A DISPLAY SOURCE

(71) Applicant: Synaptics Incorporated, San Jose, CA (US)

(72) Inventor: Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 177 days.

(21) Appl. No.: 14/582,452

(22) Filed: Dec. 24, 2014

(65) Prior Publication Data

US 2016/0189688 A1 Jun. 30, 2016

(51) Int. Cl.

| | |
|---|---|
| ***G09G 5/39*** | (2006.01) |
| ***G06T 1/60*** | (2006.01) |
| ***G09G 5/00*** | (2006.01) |
| ***G09G 5/36*** | (2006.01) |
| *G09G 5/12* | (2006.01) |

(52) U.S. Cl.

CPC ............... *G09G 5/39* (2013.01); *G09G 5/003* (2013.01); *G09G 5/36* (2013.01); *G09G 5/006* (2013.01); *G09G 5/12* (2013.01); *G09G 2320/103* (2013.01); *G09G 2330/021* (2013.01); *G09G 2340/0435* (2013.01); *G09G 2360/18* (2013.01); *G09G 2370/04* (2013.01)

(58) Field of Classification Search

CPC ........................... G09G 5/39; G09G 2360/128

USPC ........................................................ 345/545

See application file for complete search history.

(56) References Cited

U.S. PATENT DOCUMENTS

| | | | | |
|---|---|---|---|---|
| 8,732,496 | B2 | 5/2014 | Wyatt | |
| 2008/0143695 | A1 | 6/2008 | Juenemann et al. | |
| 2011/0093568 | A1 | 4/2011 | Thomas | |
| 2012/0120083 | A1 | 5/2012 | Kong et al. | |
| 2012/0207208 | A1 | 8/2012 | Wyatt et al. | |
| 2012/0236013 | A1 | 9/2012 | Wyatt et al. | |
| 2013/0021352 | A1 | 1/2013 | Wyatt et al. | |
| 2013/0141642 | A1* | 6/2013 | Wu ...................... | G06F 3/1407 348/441 |

(Continued)

OTHER PUBLICATIONS

VESA Display Device Data Block Standard, Display Device Data Block, Sep. 25, 2006, Video Electronics Standards Association, Version 1, p. 1-29.*

(Continued)

*Primary Examiner* — Samantha (Yuehan) Wang

(74) *Attorney, Agent, or Firm* — Patterson + Sheridan, LLP

(57) ABSTRACT

Embodiments of the invention generally provide a display panel that uses predefined criteria to determine when to send a request for a display frame to a display source. The predefined criteria may be, for example, when the display panel needs to refresh the display faster than the display source transmits display frames, when the display source fails to send a new display frame within a specified time period, when a maximum refresh time is exceeded and the displayed image begins to decay or leak, and the like. Furthermore, the display panel may include a frame buffer for storing the display frames received from the display source. Additional predefined criteria may be when the display frame stored in the frame buffer becomes corrupted or when the frame buffer lacks enough available memory to store the frame. In response, the display panel may request the display source retransmit the previous display frame.

16 Claims, 6 Drawing Sheets

(56) References Cited

U.S. PATENT DOCUMENTS

| | | | | |
|---|---|---|---|---|
| 2013/0235055 | A1* | 9/2013 | Kim | G09G 5/006 345/545 |
| 2013/0307835 | A1 | 11/2013 | Wu et al. | |
| 2014/0368490 | A1* | 12/2014 | Yokonuma | G09G 3/3611 345/212 |
| 2015/0243233 | A1* | 8/2015 | Bloks | G09G 3/3614 345/96 |
| 2016/0180804 | A1* | 6/2016 | Suzuki | G09G 5/006 345/520 |

OTHER PUBLICATIONS

VESA Display Stream Compression (DSC) Standard, VESA: Video Electronics Standards Association, Version 1.1, Aug. 1, 2014, pp. 1-125, Video Electronics Standards Association, Newark, United States.

* cited by examiner

400

| DISPLAY DEVICE | FRAME BUFFER | SOURCE TRANSMISSION RATE VERSUS REFRESH RATE | ACTION |
|---|---|---|---|
| EXAMPLE 1 | YES, BUT IT IS IGNORED | REFRESH RATE IS SAME AS TRANSMISSION RATE | REQUEST FRAME FROM DISPLAY SOURCE ONLY IF THE SOURCE DOES NOT SATISFY THE TRANSMISSION RATE |
| EXAMPLE 2 | NO | REFRESH RATE IS FASTER THAN TRANSMISSION RATE | REQUEST PREVIOUSLY TRANSMITTED FRAME AT A RATE TO SATISFY REFRESH RATE |
| EXAMPLE 3 | NO | REFRESH RATE IS THE SAME AS TRANSMISSION RATE | REQUEST FRAME IF ENVIRONMENTAL CONDITIONS/ DISPLAY STATE INCREASES REFRESH RATE |
| EXAMPLE 4 | NO | REFRESH RATE IS THE SAME AS TRANSMISSION RATE | REQUEST FRAME IF A HINT PROVIDED BY THE DISPLAY SOURCE IS NOT FOLLOWED AND TRANS-MISSION RATE FALLS BELOW REFRESH RATE |
| EXAMPLE 5 | NO | REFRESH RATE IS FASTER THAN TRANSMISSION RATE | REQUEST FRAMES AT THE MAXIMUM REFRESH TIME FOR THE DISPLAY TECHNOLOGY |
| EXAMPLE 6 | YES, BUT IT IS IGNORED | REFRESH RATE IS SLOWER THAN TRANSMISSION RATE | REQUEST THE DISPLAY FRAME AT A RATE TO SATISFY THE SLOWER REFRESH RATE |
| EXAMPLE 7 | NO | VARIABLE TRANSMISSION RATE | REQUEST THE FRAME IF THE MAXIMUM REFRESH RATE TIME IS EXCEEDED |

FIG. 4

600

| DISPLAY DEVICE | FRAME BUFFER | SOURCE TRANSMISSION RATE VERSUS REFRESH RATE | ACTION |
|---|---|---|---|
| EXAMPLE 1 | YES | THE DISPLAY SOURCE STOPS SENDING DISPLAY FRAMES FOR A SPECIFIED TIME | USE THE STORED FRAME UNLESS THE DATA BECOMES CORRUPTED; REQUEST FRAME FROM DISPLAY SOURCE |
| EXAMPLE 2 | YES | THE DISPLAY SOURCE STOPS SENDING DISPLAY FRAMES FOR A SPECIFIED TIME | IF THE FRAME BUFFER IS NOT LARGE ENOUGH (OR DOES NOT HAVE ENOUGH AVAILABLE MEMORY), REQUEST FRAMES TO SATISFY THE REFRESH RATE |
| EXAMPLE 3 | YES | THE DISPLAY SOURCE STOPS SENDING DISPLAY FRAMES FOR A SPECIFIED TIME | IF THE SPECIFIED TIME EXPIRES WITHOUT RECEIVING A NEW DISPLAY FRAME, REQUEST A NEW DISPLAY FRAME |

FIG. 6

REQUESTING DISPLAY FRAMES FROM A DISPLAY SOURCE

FIELD OF THE INVENTION

This invention generally relates to updating a display, and more specifically, to transmitting requests from a display panel to a display source for display frames.

BACKGROUND OF THE INVENTION

Display devices for updating images on a display screen are widely used in a variety of electronic systems. A typical display device includes a display source that provides display data that is used to update the screen. The display data may be organized into display frames which are transmitted from the source to the display screen at a predefined rate. In one example, each display frame corresponds to an image to be displayed on the screen. The display screen may include a display driver that updates the individual pixels on the display screen using the received display frames.

BRIEF SUMMARY OF THE INVENTION

One embodiment described herein includes a display panel comprising a display driver configured to transmit display frames for display on a screen and a control module. The control module is configured to receive the display frames from a display source and forward the display frames to the display driver and, upon determining a predefined criteria is satisfied, request that the display source retransmit a display frame that was previously displayed on the screen. Moreover, the display panel does not contain any memory element that stores the received display frames.

Another embodiment described herein includes a method that receives, at a display sink, display frames transmitted by a display source and transmits the received display frames for output on a screen, where the received display frames are outputted on the screen without the received display frames being stored in any memory element on the display sink. Upon determining a predefined criteria is satisfied, the method requests that the display source retransmit a display frame that was previously displayed on the screen.

Another embodiment described herein includes a display device comprising a display driver configured to transmit a display frame for display on a screen and a frame buffer configured to store the display frame. The display device also includes a control module configured to receive the display frame from a display source and forward the display frame to the display driver and, upon determining at least one of (i) the frame buffer has insufficient available memory to store the display frame and (ii) the display source has not provided a new display frame within a time period indicated by the display source, request that the display source transmit an updated display frame.

BRIEF DESCRIPTION OF DRAWINGS

The preferred exemplary embodiment of the present invention will hereinafter be described in conjunction with the appended drawings, where like designations denote like elements, and:

FIG. 4 is a chart of different examples where a display panel requests a previously transmitted display frame from the display source, in accordance with embodiments of the disclosure;

FIG. 6 is a chart of different examples where a display panel requests a display frame from the display source, in accordance with embodiments of the disclosure.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide display devices and methods that facilitate improved usability. In a display device, display panels use received display frames to update the pixels in a screen. For example, the display device may include a display source, such as a graphic processing unit, that transmits the display frames to the display panel which updates the pixels using the frame. Instead of the display source transmitting the display frames sua sponte, the display panel transmits requests to the display source for one or more display frames. In response, the display source transmits additional display frames to the display panel.

In one embodiment, the display panel uses predefined criteria to determine when to send a request for a display frame to the display source. The predefined criteria may be, for example, when the display panel needs to refresh the display faster than the display source transmits display frames (i.e., when a display refresh rate is faster than a transmission rate), when the display source fails to send a new display frame within a specified time period, when a maximum refresh time is exceeded and the displayed image begins to visibly decay or leak, and the like. Furthermore, the display panel may include a frame buffer for storing the display frames received from the display source. Additional predefined criteria for requesting a display frame may be when the display frame stored in the frame buffer becomes corrupted or when the frame buffer lacks enough available memory to store the frame. In these examples, the display panel may request that the display source retransmit the previous display frame.

Figure 1:
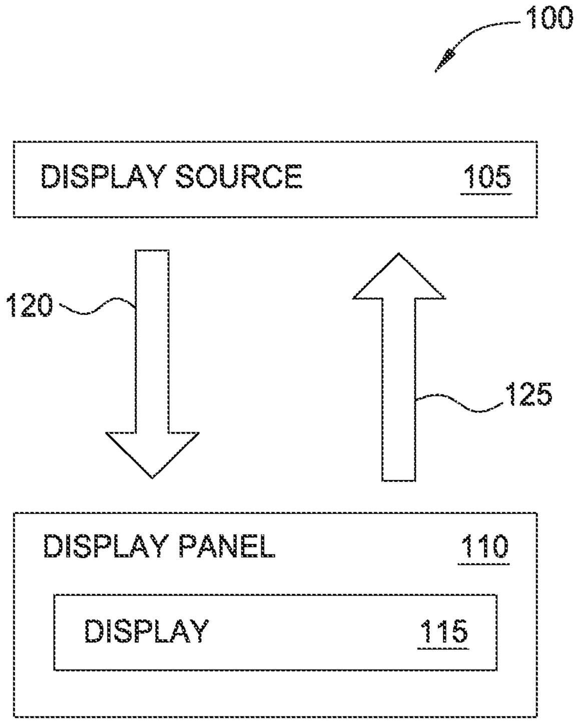
FIG. 1 is a block diagram of a display device that transmits requests for display frames from the display panel to the display source, in accordance with an embodiment of the disclosure.

FIG. 1 is a block diagram of a display device that transmits requests for display frames from the display panel to the display source in accordance with an embodiment of the invention. The display device 100 may be configured to display information for an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the display device 100.

The display device 100 can be implemented as a physical part of the electronic system, or can be physically separate from the electronic system. As appropriate, the display device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

The display device 100 includes a display source 105 and a display panel 110 (also referred to as a display sink). The display source 105 may be a graphics processing unit, a separate or integrated electronic system, and the like. The display source 105 transmits display frames (which can include compressed or uncompressed data) to the display panel 110 which then uses the display frames to update the display 115. For example, each display frame may correspond to an image displayed on the display 115, although some display frames may display the same image. Because over time the image on the display 115 begins to degrade or leak, the display panel 110 updates (i.e., refreshes) the pixels at a specified refresh rate (e.g., anywhere from 20-120 Hz or 20-120 frames per second). Each time the display panel 110 updates the display, the display image may be the same as the previously displayed image—i.e., the new display frame has the same pixel update data as the previous display frame—or display a different image—i.e., the new display frame has different pixel update data than the previous display frame.

The display 135 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

Communication path 120 illustrates data frames being transmitted from display source 105 to display panel 110. The rate at which display source 105 transmits display frames to display panel 110 is referred to herein as the transmission rate. The display panel 110 then uses the received display frames to update the display 115 according to the refresh rate. However, the transmission rate may not be the same as the refresh rate. In one example, the display source 105 transmits display frames faster than the display panel 110 refreshes display 115—i.e., the transmission rate is faster than the refresh rate. The source transmission rate may be 60 Hz, but to save power, the display panel 110 updates the display 115 at 20 Hz—i.e., uses every third display frame to refresh the display 115 while the other frames are ignored or discarded. Alternatively, the display refresh rate may be faster than the source transmission rate. For example, the display source 105 may transmit display frames at a rate of 20 Hz but the display panel 110 updates the display 115 at 60 Hz. To maintain the 60 Hz refresh rate, the display panel 110 may use the previously sent display frames to refresh the display 115 if the display source 105 has not sent a new display frame. Because in this example the display panel 110 updates the display 115 every $1/60$th of a second but receives a new display frame only every $3/60^{th}$ of a second, the display panel 110 may refresh the display 115 with the same display frame three times, thereby achieving the 60 Hz refresh rate.

In addition to communication path 120 for receiving display frames, the display device 100 includes communication path 125 for transmitting requests from the display panel 110 to the display source 105 for display frames. For example, the display panel 110 may lack a frame buffer for storing the display frames received from display source 105, or the frame buffer may not have enough space to store the received display frame. In either case, the display panel 110 transmits a request to the display source 105 along path 125 to transmit a previously transmitted display frame (or a new display frame) so that the refresh rate for the display 115 is maintained—e.g., the display 115 is updated at 60 Hz. The various different scenarios and situations where the display panel 110 may request a display frame from the display source 105 will be discussed in more detail below.

In one embodiment, the display panel 110 uses communication path 125 (or path 120) to transmit the maximum refresh rate supported by the display panel 110 to the display source 105 which may use the maximum refresh rate to adjust the rate at which it transmits display frames to the display panel 110 (i.e., the transmission rate). For example, if the display panel 110 refreshes the display 115 at a rate of 60 Hz, the display source 105 may transmit new display frames to the panel 110 at a rate of 60 Hz, if possible. However, if the new display frames are not available, the display panel 110 may use communication path 125 to request that the display source 105 provide previously transmitted display frames.

Communication paths 120 and 125 may be wired or wireless communication paths. If a wired communication technique is used, the paths 120, 125 may be in the same cable (e.g., a HDMI or DisplayPort cable) or in different cables. Furthermore, the paths 120, 125 may share the same wires (or groups of wire) or include different wires. For example, if the path 120 and 125 share the same wires, the display source 105 and display panel 110 may use interrupts or synchronization techniques to prevent collisions.

The display source 105 may be mounted on a same substrate as display panel 110 or on separate substrates. Furthermore, display source 105 and display panel 110 may be contained within the same enclosure (e.g., a mobile phone, tablet, laptop, etc) or in separate enclosures. For example, the display source 105 may be in a computer tower while the display panel 110 is a standalone monitor.

Figure 2A:
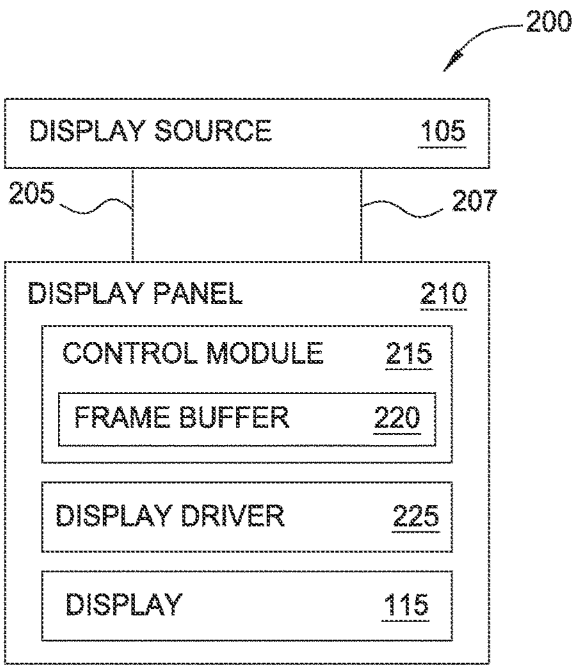
FIGS. 2A-2B are a block diagrams of display devices with and without a frame buffer, in accordance with embodiments of the disclosure.
Figure 2B:
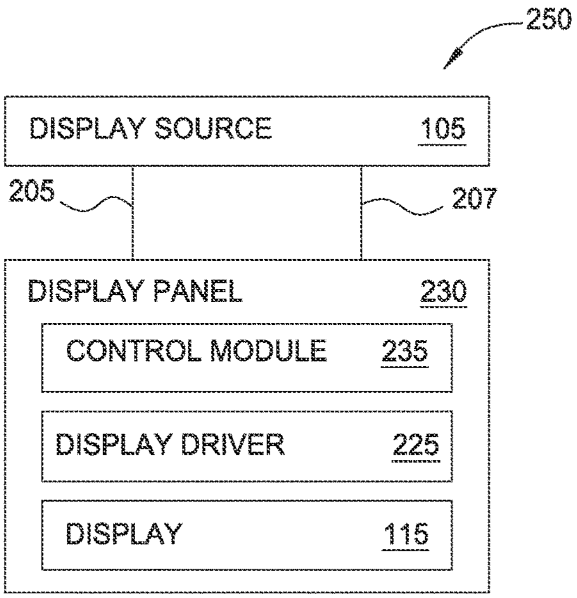

FIGS. 2A-2B are block diagrams of display devices with and without a frame buffer in accordance with embodiments of the disclosure. Specifically, FIG. 2A illustrates a display device 200 that includes display source 105 and display panel 210. As discussed above, display source 105 transmits display frames to the display panel 210 using data connection 205 and receives requests for display frames via data connection 207. Although shown here as two separate connections 205, 207, in another embodiment, the display frames and the requests for display frames may be transmitted on the same data connection.

Display panel 210 includes a control module 215, a display driver 225, and the display 115. The control module 215 includes control logic for forwarding the received display frames to the display driver 225 which updates the display 115 and determining when to request a new or previously transmitted display frame from the display source 105. For example, the control module 215 may store the predefined criteria discussed above that is used to determine when the display panel 210 should request a display frame from the source 105. The control module 215 may be a timing controller, display controller, and the like and may be part of an integrated circuit or system on a chip. Moreover, the control module 215 may be on the same substrate as the display source 105 (e.g., mounted on the same PCB) or mounted on different substrates.

The control module 215 includes a frame buffer 220 which may include volatile or non-volatile memory (e.g., RAM, hard disk, Flash memory, and the like). The control module 215 may selectively store received display frames in the frame buffer 220. For example, to save power, when the image on the display 115 is unchanged over a period of time, the display source 105 may transmit the display frame corresponding to that image to the display panel 210 only once. The control module 215 saves the display frame in the frame buffer 220 and can then refresh the display 115 using the stored copy of the display frame. For instance, the display source 105 may send a display frame to the control module 215 along with a message that a new frame will be transmitted in one second. Assuming a 60 Hz refresh rate, the control module 215 stores the display frame in the frame buffer 220 and uses that copy to refresh the display 115 sixty times in the one second interval to maintain the 60 Hz refresh rate. If the display source 105 does not transmit a new display frame once the second is over, the control module 215 uses the data connection 207 to request an updated or new display frame from the display 115.

In other embodiment, the frame buffer 220 may be ignored—i.e., the control module 215 purposely determines not to store the received display frame in the frame buffer 220. For example, if the display source 105 transmits display frames at the same rate at which the display driver 225 updates the display 115 (i.e., the transmission rate is the same as the refresh rate), the control module 215 may forward the received display frame to the display driver 225 without storing the display frame in the frame buffer 220, thereby saving the power that would otherwise be used to store the display frame. Moreover, this frees up the frame buffer 220 to be used for other purposes—e.g., storing images captured by a camera in the display device 200. Thus, even if the display panel 210 does include sufficient memory to store the received display frames, the control module 215 may purposively decide not to use the memory. If the transmission rate and/or refresh rate change such that the transmission rate is now slower than the refresh rate, the control module 215 can use the data connection 207 to request additional frames from the display source 105 in order to satisfy the refresh rate, thereby effectively increasing the transmission rate of the display source 105.

In one embodiment, the control module 215 and the display driver 225 are embodied in separate integrated circuits. Alternatively, the display driver 225, along with one or more source drivers coupled to source lines in the display 115, may be included within a common integrated circuit. In one embodiment, the control module 215 and the display driver 225 are mounted on a common substrate—e.g., a planar or flexible PCB which may also be attached to the display 115. Alternatively, the display driver 225 may be fixed to the display 115 to form a unitary module while the control module 215 is mounted on a separate substrate.

FIG. 2B illustrates a display device 250 where a control module 235 does not include a frame buffer. Although the control module 235 does not include a frame buffer, that does not necessarily mean the control module 235 (or the display panel 230 in general) does not include memory elements. The control module 235 may contain memory elements, but these memory elements are not used to store display frames received from the display source 105. By omitting the frame buffer, the control module 235 may be cheaper to manufacture and to operate relative to the control module 215 in FIG. 2A that includes frame buffer 220. For example, control module 235 may include fewer memory modules than control module 215 which may reduce its size, cost, and/or complexity.

Like in FIG. 2A, the control module 235 may request the display source 105 retransmit a previous display frame using data connection 207. For example, at Time A, the transmission rate and the refresh rate are the same (e.g., 24Hz), and thus, the control module 235 forwards each received display frame to the display driver 225 which updates the display 115. However, the display driver 225 may change a state of the display 115 where the refresh rate increases from 24Hz to 60Hz. In response, the control module 235 may transmit a plurality of requests to the display source 105 (in addition to the display source 105 transmitting a new display frame every 1/24th of a second) so that the display panel 230 receives a display frame (either a previously transmitted display frame or a new display frame) from the display source 105 to satisfy the new refresh rate of 60Hz. That is, the control module 235 transmits requests for previously transmitted display frame to supplement the new display frames already being sent from display source 105 such that the display source 105 transmits display frames to the control module 235 at the same rate at which the display driver 225 needs to refresh the display 115. In this manner, the display panel 230 is able to refresh the display 115 at the desired refresh rate without relying on a frame buffer to store the received display frames.

Figure 3:
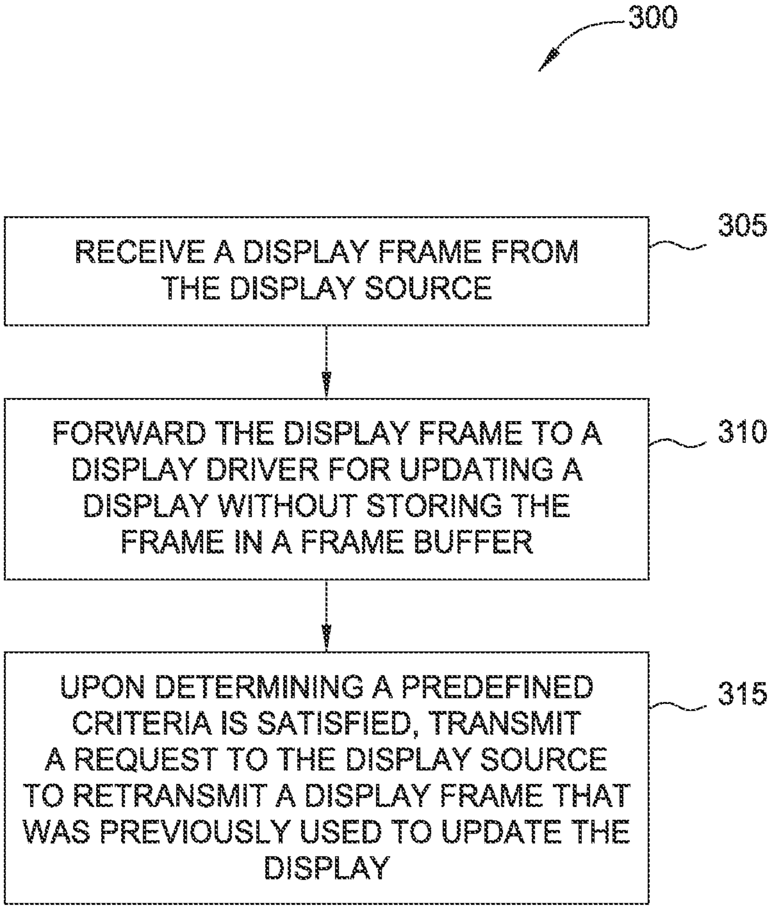
FIG. 3 is a method for transmitting a request to a display source to retransmit a display frame, in accordance with an embodiment of the disclosure.

FIG. 3 is a method 300 for transmitting a request to a display source to retransmit a display frame in accordance with an embodiment of the disclosure. At block 305, the control module receives a display frame from the display source. As stated above, the rate at which the display source transmits display frames to the control module and the display panel is the transmission rate. The display module includes a communication path that permits the control module to send requests to the display source to transmit, for example, a previous display frame. Doing so effectively changes the transmission rate of the display frames between the display source and the display panel. That is, by sending the request for a previously transmitted display frame, the control module increases the rate at which the display panel receives display frames.

At block 310, the control module forwards the display frame to the display driver for updating the display without storing the frame in the frame buffer. Accordingly, the method 300 is used in a display device where there is no memory for storing the display frames in the display panel (e.g., the display device 250 in FIG. 2B) or, if there is a frame buffer, the buffer is ignored—i.e., not used to store the received frames. Because the display panel does not store a local copy of the display frame, the panel is unable to refresh the display without receiving another display frame for the display source. For example, the display source may transmit a display frame to the display panel along with instructions that the corresponding image should be displayed until the display source sends a new display frame. However, if the display source does not send a new display frame before the display panel needs to refresh the image being displayed, the control module requests that the display source retransmit the previous display frame (since the display panel does not store the display frames locally).

At block 315, upon determining a predefined criteria is satisfied, the control module sends a request to the display source to retransmit the display frame that was used previously to update the display. In the previous example, the 'predefined criteria' is that the display source failed to send a new display frame before the display panel needs to refresh the image on the display. Thus, the control module requested that the display source retransmit the display frame.

FIG. 4 is a chart 400 of different examples of predefined criteria that may be monitored to determine when to request that the display source retransmit a previously transmitted display frame. The examples provided in chart 400 are not intended be an exhaustive list of predefined criteria which may be used to determine when to transmit a request from the display panel to the display source for a previous display frame.

In Example 1, the display panel includes a frame buffer, or at least includes sufficient memory to store a received display frame, but chooses not to store the received display frames in memory. Moreover, in this example, the transmission rate is expected to be the same as the refresh rate. Thus, as each new display frame is received at the display panel, the display driver uses the display frame to update the display without the display frame being stored in local memory (e.g., a frame buffer). In one embodiment, the display driver updates the display in parallel with the display panel receiving the display frame. For example, as data chunks of the display frame are received, the display panel may forwards those data chunks to the display driver. Thus, as additional data chunks for the display frame are received, the display driver may already be updating the display using the previously received chunks.

However, if the display source does not satisfy the transmission rate as expected (e.g., the transmission rate falls below the refresh rate), the control module may request the display source transmit previously transmitted display frames in order to satisfy the refresh rate. For example, if the transmission rate decreases to approximately 20 Hz and the refresh rate is 60 Hz, the control module may send two requests for a previously transmitted display frame for each time the display source sends a new display frame sua sponte. Thus, the predefined condition in this example for determining whether to transmit one or more request for previously transmitted display frames is that the transmission rate changes to a rate that is slower than the refresh rate, and thus, the requests are used in order to increase the transmission rate to satisfy the refresh rate.

In Example 2, the display panel does not include a frame buffer, or does not have sufficient memory to store a received display frame. In this example, the refresh rate is faster than the transmission rate. As such, the control module transmits requests to the display source to send previously transmitted display frames such that the refresh rate is satisfied. For example, if the transmission rate is approximately 20 Hz and the refresh rate is 60 Hz, the display source transmits sua sponte a display frame every 1/20th of a second. But by making two additional requests each time the display source sends a new display frame, the display source ends up transmitting display frames at a rate of 60 Hz. Thus, the predefined condition in Example 2 is that the transmission rate is slower than the refresh rate, and thus, the requests are used in order to increase the transmission rate to satisfy the refresh rate.

In Example 3, the display panel does not include a frame buffer, or does not have sufficient memory to store a received display frame. In this example, the transmission rate is expected to be the same as the refresh rate. However, due to environmental conditions, the display device may increase the refresh rate such that it is faster than the transmission rate. For example, as temperature increases, the images on the display may leak or degrade faster. Thus, to prevent the user from noticing this image degradation, the display device may increase the refresh rate (e.g., from 20 Hz to 60 Hz). However, if the transmission rate is only 20 Hz, then the display device has the same problem as that in Example 2. In response, the control module requests that the display source retransmit previously transmitted display frames in order to satisfy the changed refresh rate.

In another embodiment, the display state of the display device may change, thereby changing the refresh rate. For example, the user may switch the device from a low power state to a high power state, which increases the refresh rate. The user may do so when she wishes to watch a HD movie on the display device and wants improved image quality. Thus, in Example 3, the predefined criteria may be monitoring environmental conditions or display states of the device to detect when the refresh rate becomes faster than the transmission rate.

In Example 4, the display panel does not include a frame buffer, or does not have sufficient memory to store a received display frame. In this example, the transmission rate is expected to be the same as the refresh rate. In some display technologies, however, the display source may selectively provide a display frame along with a hint that estimates when the display source will likely send the next display frame. For example, the hint may state that the next display frame is expected to be sent in 1/20th of a second. If the refresh rate is 20 Hz, then control module does not need to request the display source retransmit the previous display frame since the new display frame is expected in time to satisfy the display panel's refresh rate. However, the hint may turn out to be an incorrect estimate in which case the display source does not transmit a new display frame within the estimated time period (e.g., 1/20th of a second). Thus, the control module may transmit a request for the previous display frame to be retransmitted in order to satisfy the refresh rate. Similarly, if the refresh rate is 60 Hz (which requires receiving a display frame every 1/60th of a second), then the control module may send two requests to the display source in order to satisfy the refresh rate. Thus, in Example 4, the predefined criteria is transmitting a request to the display source when a new display frame is not received in the time indicated in the hint which would violate the refresh rate.

In Example 5, the display panel does not include a frame buffer, or does not have sufficient memory to store a received display frame. In this example, the refresh rate is expected to be faster than the transmission rate. However, unlike in Example 1-4 where the control module requests previously transmitted display frames to satisfy the refresh rate, here the control module requests the display frames from the source driver in order to satisfy the maximum refresh time for the particular display technology (e.g., LED, OLED, LCD, etc.) which may be longer than the time period established by the refresh rate. As used herein, the maximum refresh time is the maximum time the display can hold an image before the viewer notices that the image has become degraded or leaked. The pixels in the display may include capacitive elements that hold a charge (which sets the color of the pixel) only for a short time. If the voltages across the capacitive elements are not refreshed, the pixels begin to change color, thereby causing the image to degrade or leak. To avoid this degradation, the refresh rate may be set to refresh the display at periods that are shorter than the maximum refresh time—e.g., if the maximum refresh rate is 1/10th of a second, the refresh rate may be set to 20 Hz (the pixels are refreshed every 1/20th of a second).

Even if the display panel does not operate at the refresh rate because the display source fails to send a new display frame in time to satisfy the refresh rate (e.g., the display source does not send a new display frame within 1/20th of a second from sending a previous display frame), the control module does not immediately request that the display source retransmit the previous display frame. That is, the control module may selectively choose to ignore the refresh rate. Instead, the control module transmits a request for the previous display frame in order to make sure the time elapsed since the display was last updated does not exceed the maximum refresh time. For example, each time the maximum refresh time elapses without the display source transmitting a new display frame to the display panel, the control module requests that the display source retransmit the previous display frame, which the display panel then uses to update the display. In this example, the predefined criteria is whether the display panel has received a new display frame within the maximum refresh time. If not, the control module requests that the display source retransmit the previous display frame.

In one embodiment, the maximum refresh time may change in proportion to environmental conditions. For example, as the display temperature increases, the pixels may be able to hold their charge for a shorter time before the user can notice image degradation. As a result, the maximum refresh time decreases and the control module continues to request previously transmitted display frames to prevent the user from noticing image degradation.

In Example 6, the display panel includes a frame buffer, or at least sufficient memory to store the received display frames, but chooses not to store the frames in memory. In this example, it is expected that the refresh rate will be slower than the transmission rate. That is, the display source transmits more display frames than the display panel needs in order to satisfy the refresh rate. Here, the display panel may ignore the display frames transmitted sua sponte by the display source and instead uses a plurality of requests to receive display frames at a rate that matches the desired refresh rate. For example, if the refresh rate is 20 Hz, the control module transmits twenty requests a second for the most recently transmitted display frame. That is, for each of the requests, the control module may request the display source to retransmit the display frame it sent most recently to the display panel. In this manner, the display panel can process the display frames at the slower refresh rate rather than the transmission rate. In this example, the predefined criteria is whether the transmission rate is faster than the refresh rate in which case the control module requests the display source transmit the display frames at a slower rate to match the refresh rate.

In Example 7, the display panel does not include a frame buffer, or does not have sufficient memory to store a received display frame. Unlike the other examples in chart 400, the display panel may not know an expected or estimated transmission rate. That is, the transmission rate may be variable and change constantly. For example, some computing applications (e.g., video games) do not generate new display frames at a regular interval. As such, the display source may transmit new display frames to the display panel at different, unpredictable intervals (e.g., a variable rate).

The display panel may wait until the maximum refresh time is (or is about to be) exceeded before transmitting a request to the display source for the previously transmitted display frame. Stated differently, the display panel waits until the degradation of the currently displayed image is, or is about to be, noticeable to the viewer. If a new display frame is not received, the display panel transmits a request for the previously transmitted display frame. Each time a new or previously transmitted display frame is received, the display panel resets a timer that determines whether the maximum refresh time has elapsed (or is about to elapse) since a display frame was last received.

The examples in chart 400 illustrate that the display panel does not need to have a frame buffer or sufficient available memory to still be able to satisfy the desired refresh rate or the maximum refresh time. As such, the amount of memory in the display panel may be reduced relative to a display panel that does save the received display frame. Moreover, even if the display panel does include the frame buffer, the display panel may allow other types of data to be stored in the frame buffer (e.g., data captured by a camera) even if that means that there is insufficient room in the buffer for the display frames. In this situation, the display panel may request a previously transmitted display frame from the display source rather than relying on a local stored copy of the display frame.

Furthermore, in the examples in chart 400, the display panel and display source do not need to communicate the refresh rate and transmission rates to each other. That is, the display panel does not need to know the transmission rate of the display source which means the two rates can change without the display source informing or getting permission from the display panel and vice versa. For example, even if the transmission rate falls below the refresh rate, the display panel can request previously transmitted display frames in order to maintain the desired refresh rate. Alternatively, if the transmission rate exceeds the refresh rate, the display panel may send requests at a rate that matches the slower refresh rate. Regardless of how the transmission and refresh rates may change, the display panel can request display frames from the display source that satisfy the desired refresh rate and/or the maximum refresh time.

Figure 5:
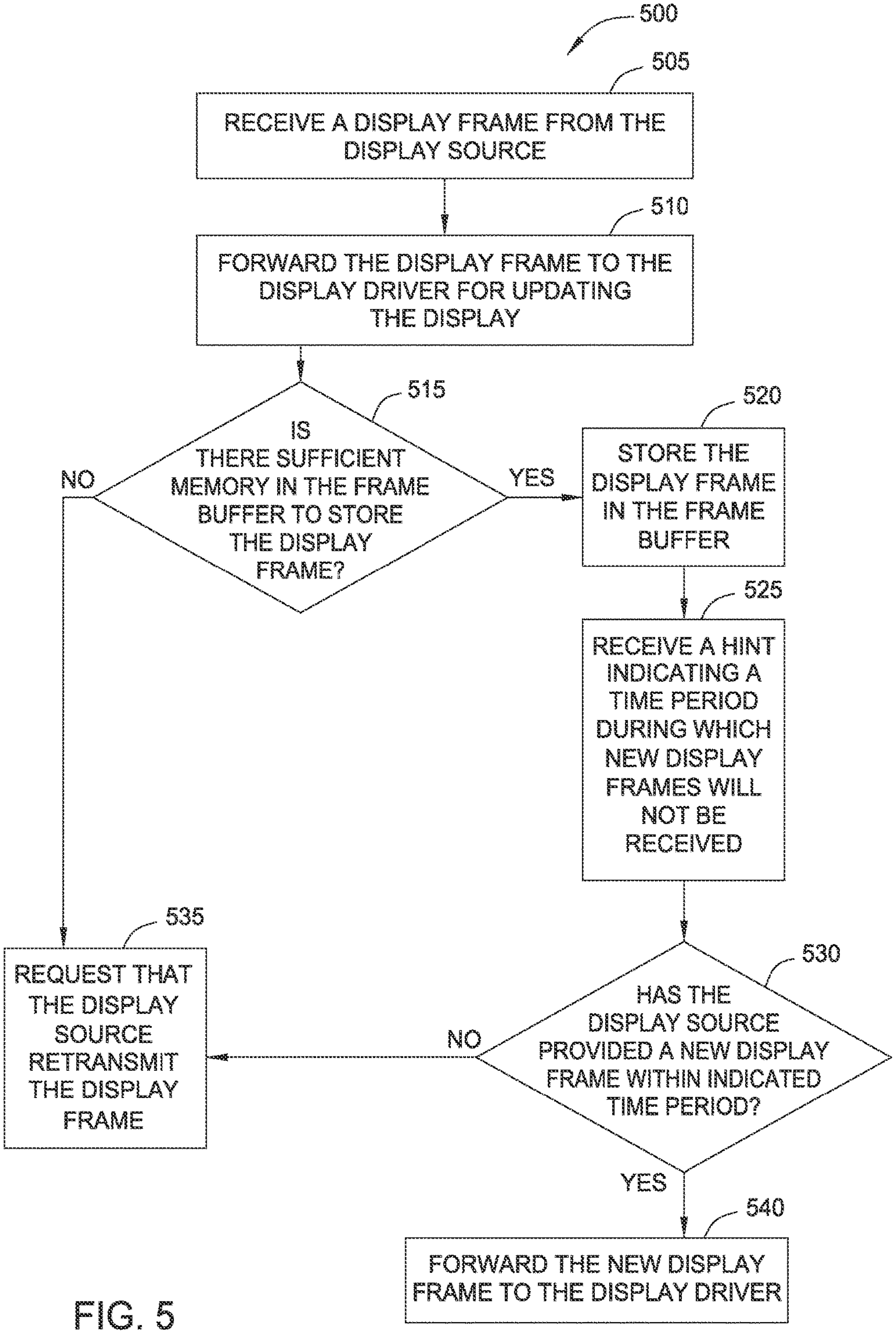
FIG. 5 is a method for requesting a display source to transmit a display frame to a display panel, in accordance with an embodiment of the disclosure.

FIG. 5 is a method 500 for requesting a display source to transmit a display frame to a display panel in accordance with an embodiment of the disclosure. In the method 500, it is assumed that the transmission rate is slower than the refresh rate. Further still, in one embodiment, the display source may have temporary paused or stopped transmitting display frames to the display panel.

The method 500 begins at block 505 where the control panel receives a display frame from the display source. At block 510, the control module forwards the received display frame to the display driver for updating the display. The display driver may use the received display frame to update the display before, after, or while the control module stores, or attempts to store, a display frame in the frame buffer in the display panel.

At block 515, the control module determines if there is sufficient available memory in the frame buffer to store the display frame. For example, if the display panel permits other modules or applications in the display device to store data in the frame buffer, then the buffer may lack enough space to store the received display frame.

If the frame buffer lacks sufficient space, at block 535, the control module requests that the display source retransmit the display frame in order to satisfy the desired refresh rate or maximum refresh time. Because previously received display frames cannot be stored locally in the frame buffer, the control module may use the data connection 207 shown in FIG. 2A to request additional (i.e., previously transmitted)

display frames from the display source in order to ensure the display is updated at the desired refresh rate.

However, if there is sufficient available memory, at block 520, the control module stores the received frame in the frame buffer. The stored copy may then be used to update the display if the display sources stops sending new display frames to the display panel. For example, at block 525, the control module receives a hint (which may accompany a new display frame) that indicates a time period during which new display frames will not be received. The display source may stop transmitting display frames to the display panel and use the hint to indicate when the display source expects to resume transmitting new display frames to the panel. In one example, the display source may transmit the hint to the display panel during a low power mode when the display refresh rate is decreased (or stopped completely). In another example, the display source may send the hint when it determines or predicts that there is no change in the display image, and thus, if the display source did transmit a new display frame it would be a copy of the previously transmitted frame—i.e., the display frame data would not change.

During the time period indicated by the hint, the display panel uses the stored display frame to update the display. For example, if the hint indicates that the display source expects to resume transmitting new display frames after one second (assuming a 60 Hz refresh rate), the display panel uses the display frame stored in the frame buffer to update the display sixty times during the one second time period.

At block 530, the control module determines if the display source provided a new display frame within an indicated time period. If the time period indicated in the hint expires without the display source transmitting a new display frame, the method 500 proceeds to block 535 where the display panel requests that the display source provide an updated display frame. In one embodiment, the display source may send the previously transmitted display frame to the display panel in response to the request. Alternatively, the display source sends a new display frame (i.e., different than the previously transmitted display frame that is currently stored in the frame buffer) to the display panel.

However, if the display source does transmit a new display frame before the time indicated in the hint expires, at block 540, the control module forwards the display frame to the display driver which updates the display. Moreover, the control module may store the new display frame in the frame buffer which may require the control module to delete the previous display frame from the buffer.

FIG. 6 is a chart 600 of different examples where a display panel requests a display frame from the display source in accordance with embodiments of the disclosure. The examples provided in chart 600 are not intended be an exhaustive list of predefined criteria which may be used to determine when to transmit a request from the display panel to the display source for a previously transmitted display frame or a new display frame. In contrast to the examples in chart 400 of FIG. 4, all the examples in chart 600 store the received display frames in a frame buffer—i.e., within local memory in the display panel.

In Example 1, the display source pauses or stops transmitting display frames to the display panel. As discussed in the method 600, the display source may provide a hint to the display panel that specifies how long until the display source is expected to resume transmitting display frames. If the time period specified in the hint is longer than the time period between display updates set by the refresh rate or exceeds the maximum refresh time, the display panel uses the display frame stored in the buffer to update the display. For example, assuming a refresh rate of 60 Hz, if the time period in the hint is greater than 1/60th of a second, then the display panel may use the stored display frame to update the panel every 1/60th of a second to maintain the desired refresh rate. Or, instead of maintaining the refresh rate, the display panel may use the stored display frame to update the panel if the time period in the hint is longer than the maximum refresh time.

However, if the data stored in the frame buffer becomes corrupted, the display panel requests that display source retransmit the previous display frame. For example, before using the stored display frame to update the display, the control module may check the underlying data for errors. If the data contains an error, the control module requests a new copy of the display frame from the display source. Thus, the predefined criteria in this example for determining whether to request a display frame from the display source is whether the data in the frame buffer becomes corrupted.

In Example 2, the display source pauses or stops transmitting display frames to the display panel and provides a hint that indicates how long until the next display frame is received—i.e., when the display source is expected to resume transmitting display frames. If the frame buffer does not contain sufficient available memory to store the display frame, during the time period specified in the hint, the control module transmits requests to the display source for the previously transmitted display frame in order to satisfy the refresh rate or the maximum refresh time. Later, if the available memory in the frame buffer increases such that the display frame can now be saved, the control module may stop transmitting the requests to the display source and instead used the stored display frame to maintain the refresh rate or ensure the maximum refresh time is not exceeded. Thus, the predefined criteria in this example is whether the frame buffer does not contain sufficient available memory to store the display frames received from the display source.

In Example 3, the display source pauses or stops transmitting display frames to the display panel and provides a hint that indicates how long until the next display frame is received. During the time period specified in the hint, the display panel may behave as described in Example 1 or 2 depending on the whether the predefined criteria described in those examples is satisfied. However, if the time period specified in the hint expires without the display panel receiving a new display frame, the control module transmits a request to the display source for the most recent display frame. This is shown in blocks 530 and 535 of the method 500. In response to the request, the display source transmits the previous display frame, or if available, a new display frame to the display panel. Thus, the predefined criteria in this example is whether the time period in the hint has expired without the display panel receiving an new display frame from the display source.

The examples in chart 600 illustrate that by requesting that a display source transmit additional display frames, the display panel is able to correct errors data stored in the frame buffer, permit other types of data to be stored in the frame buffer even if that means there is insufficient room for storing a display frame, and prompt a display source to transmit a new display frame if the time period indicated in a hint is exceeded. Display devices without a communication path that permits the display panel (i.e., a display sink) to request a previous or new display frame from the display source must ensure the frame buffer always has a enough room to store received data frames. Furthermore, if the data in the frame buffer becomes corrupted, the display device may be forced to display an incorrect image.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the display device 100). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

I claim:

1. A display panel, comprising:
an integrated circuit comprising:
a display driver configured to transmit display frames for updating a display of a display device; and
a control module configured to:
receive the display frames from a display source and forward the display frames to the display driver, the display frames comprising a display frame previously displayed on the display and a display frame not previously displayed on the display; and
upon determining that the display source has faded to transmit a new display frame to the control module before a maximum time period has expired, transmit a request from the display panel to the display source requesting that the display source retransmit the display frame that was previously displayed on the display, the maximum time period is a time period a current image can be displayed on the display before the current image begins to degrade visibly,
wherein the control module does not contain a frame buffer configured to store the received display frames.

2. The display panel of claim 1, wherein the control module is further configured to transmit a message to the display source indicating a maximum refresh rate supported by the display panel.

3. The display panel of claim 1, wherein the control module is further configured to: determine that a refresh rate of the display driver is faster than a rate at which the display source transmits display frames to the control module, and request the previously displayed frame from the display source in order to satisfy the refresh rate of the display driver.

4. The display panel of claim 1, wherein the control module is further configured to:
receive a hint from the display source indicating a time when a next display frame is expected to be transmitted to the control module; and determine that the next display frame has not been received by the indicated time.

5. The display panel of claim 1, wherein the control module is further configured to: receive a hint from the display source indicating that a next display frame is expected to be transmitted to the control module in a period of time that violates a refresh rate of the display driver; and
transmit the request to the display source for the previously displayed frame in order to maintain the refresh rate.

6. The display panel of claim 1, further comprising an enclosure that contains the display source, the control module, and the display driver.

7. The display panel of claim 1, further comprising a connection interface configured to communicate with the display source, wherein the display source is external to the display panel.

8. A method for updating a display of a display device, comprising:
receiving, at a control module of an integrated circuit of a display sink, display frames transmitted by a display source, the display frames comprising a display frame that was previously displayed on the display and a display frame not previously displayed on the display;
transmitting, at a display driver of the integrated circuit, the received display frames for output on the display, wherein the control module of the display sink does not have a frame buffer for storing the received display frames; and
upon determining that the display source has failed to transmit a new display frame to the display sink before a predetermined maximum refresh time has expired, transmitting a request from the display sink to the display source requesting that the display source retransmit the display frame that was previously displayed on the display, wherein the maximum refresh time is a maximum time period a current image can be displayed on the display before the current image begins to degrade visibly.

9. The method of claim 8, further comprising determining that a refresh rate of the display sink is faster than a rate at which the display source transmits display frames to the display sink, wherein the display sink transmits the request for the previously displayed frame in order to satisfy the refresh rate.

10. The method of claim 8, further comprising: receiving a hint from the display source indicating a time when a next display frame will be transmitted to the display sink, and determining that the next display frame has not been received by the indicated time.

11. The method of claim 8, further comprising: receiving a hint from the display source indicating that a next display frame will be transmitted to the display sink in a period of time that violates a refresh rate of the display sink; and
transmitting the request to the display source for the previously displayed frame in order to maintain the refresh rate.

12. An integrated circuit comprising:
a display driver configured to transmit display frames for updating a display of a display device; and
a control module configured to:
receive the display frames from a display source;
forward the display frames to the display driver, the display frames comprising a display frame previously displayed on the display and a display frame not previously displayed on the display; and upon determining that the display source has failed to transmit a new display frame to the control module before a maximum time period has expired, transmit a request to the display source requesting that the display source retransmit the display frame that was previously displayed on the display, the maximum time period is a time period a current image can be displayed on the display before the current image begins to degrade visibly, wherein the control module does not contain a frame buffer configured to store the received display frames.

13. The integrated circuit of claim 12, further comprising a connection interface configured to communicate with the display source.

14. The integrated circuit of claim 12, wherein the control module is further configured to:

determine that a refresh rate of the display driver is faster than a rate at which the display source transmits the display frames to the control module; and request the previously displayed frame from the display source in order to satisfy the refresh rate of the display driver.

15. The integrated circuit of claim 12, wherein the control module is further configured to:

receive a hint from the display source indicating a time when a next display frame is expected to be transmitted to the control module; and determine that the next display frame has not been received by the indicated time.

16. The integrated circuit of claim 12, wherein the control module is further configured to transmit a message to the display source indicating a maximum refresh rate supported by the display panel.

* * * * *